United States Patent [19]

Williams

[11] Patent Number: 4,938,155
[45] Date of Patent: Jul. 3, 1990

[54] FLUIDIZED BED COMBUSTION APPARATUS FOR GENERATING ENVIRONMENTALLY-INNOCENT ASH

[76] Inventor: Robert M. Williams, 16 La Hacienda, Ladue, Mo. 63124

[21] Appl. No.: 345,189

[22] Filed: May 1, 1989

[51] Int. Cl.[5] ............................ F23G 5/02; F23G 7/00
[52] U.S. Cl. .................................... 110/345; 110/220; 110/221; 110/224; 110/254; 110/346
[58] Field of Search ............... 110/219, 220, 221, 218, 110/222, 224, 254, 346, 345

[56] References Cited

U.S. PATENT DOCUMENTS

| | | | |
|---|---|---|---|
| 2,102,427 | 12/1937 | Llyod et al. | 110/224 |
| 2,148,447 | 2/1939 | Dunders et al. | 110/224 |
| 3,670,669 | 6/1972 | Hoad | 110/220 |
| 3,794,565 | 2/1974 | Bielski et al. | 110/254 |
| 3,826,208 | 7/1974 | Williams | 110/224 |
| 4,121,524 | 10/1978 | Voelskow et al. | 110/220 |
| 4,133,273 | 1/1979 | Gleanon | 110/221 |
| 4,593,477 | 6/1986 | Dziubakowski | 34/10 |
| 4,608,944 | 9/1986 | Kärna | 122/4 |
| 4,628,838 | 12/1986 | Love | 110/347 |
| 4,633,818 | 1/1987 | Horlitz et al. | 122/4 |
| 4,646,637 | 3/1987 | Cloots | 110/245 |
| 4,671,251 | 6/1987 | Anderson et al. | 126/99 |
| 4,699,721 | 10/1987 | Meenan et al. | 210/771 |
| 4,750,437 | 6/1988 | Rouse | 110/220 |

Primary Examiner—Henry C. Yuen
Attorney, Agent, or Firm—Gravely, Lieder & Woodruff

[57] ABSTRACT

A method for disposing by incineration of waste material containing sludge and garbage of various kinds which when combined results in a composite waste material prepared by performing multiple steps in its handling wherein the composite material is first subjected to a grinding step for thorough intermixing of the sludge that may contain a high percentage of moisture with garbage that can contain very little moisture. After grinding, the composite waste material is processed in a cyclone where the gases that are used to transport the ground matter can be separated while the solids are subjected to classification by the use of a vibratory screen where the paper, fluffy waste, and similar materials can be separated from the smaller and harder particulate components. The separated components are subjected to individual impact grinding steps prior to being recombined in the combustor where incineration takes place. The gases separated in the cyclone separator are reapplied to the grinding steps for moving such material into the incinerating combustor, and any excess gases are delivered to the incinerator, along with ambient air for establishing sufficient oxygen to support combustion in the furnace at a temperature that will sanitize and destroy odors during the incineration of the waste material and after the sanitizing step in the incinerator, the gases are exhausted through suitable heat exchanges and filtering medium.

2 Claims, 1 Drawing Sheet

FLUIDIZED BED COMBUSTION APPARATUS FOR GENERATING ENVIRONMENTALLY-INNOCENT ASH

BACKGROUND OF THE INVENTION

1. Field of the Invention

The present invention is directed to apparatus for disposing of sludge, garbage and the like by burning to produce a sanitized waste char for disposal.

2. Description of the Prior Art

There is a continuing problem in how to effectively dispose of sludge, garbage and similar waste materials in other than by land fill disposal. The present approaches appear to employ expensive and sometimes inefficient fluid bed combustors. The known prior art is limited in its teaching, and is directed to expensive solutions which touch on only portions of the present problems. It has been recognized that waste material is often contaminated with toxic chemicals of several different types, the most potent being polychlorinated bipharyls (PCB) which create long range hazards. Thermal decomposition of such toxic waste has been tried at great cost.

Attempts have been made to dispose of sludge, which is very wet, by first drying the moisture from the sludge and then conveying it into combustion equipment where outside fuel is used in large quantities in order to sufficiently dry the sludge to a condition where it can be carted away to a land fill location, or be otherwise disposed of. Examples of prior art apparatus for waste disposal include: U.S. Pat. No. 4,593,477, date June 10, 1986; U.S. Pat. No. 4,608,944 date Sep. 2, 1986; U.S. Pat. No. 4,628,838, date Dec. 16, 1986; U.S. Pat. No. 4,646,637, date Mar. 3, 1987; U.S. Pat. No. 4,671,251, date Jun. 9, 1987; U.S. Pat. No. 4,685,220, date Aug. 11, 1987; and U.S. Pat. No. 4,699,721 date Oct. 13, 1987.

A BRIEF SUMMARY OF THE INVENTION

The invention is directed to a system, the object of which is to prepare garbage and sludge in apparatus where it can be prepared by grinding, mixing and otherwise treating the components so that disposal by combustion can be initiated. The apparatus is adapted to remove a large percentage of moisture so that the residue of the processed solids that still remain can be supplied to a combustor for destructive combustion of the partially dried or dried mix of material. The present invention has as a primary object the self destruction by combustion of most any character of waste from sources such as sewage, paper mill sludge, and garbage. This recital identifies several of the more common types or sources of waste material.

It is a further object of the present invention to treat sludge in a system that prepares the sludge and any moisture containing component for reduction in a preparatory step by separating the waste material in a series of process steps where large and small particles undergo reduction treatment before going to a combustion zone where any retained moisture is converted to a vapor at a temperature that produces a conversion of the solids in the sludge, whereby the by-product of the present invention gets rid of the liquid and vapor components at a temperature that does not pollute the ambient atmosphere when released, and produces a by-product which is highly useful for neutralizing the heavy metal components which are discarded in land fill operations.

Still another object of the present invention is to regulate the temperature and condition of the moisture in the system so that a proportion of the vapor discharged from the combustor can be returned to the initial grinding mill for effecting partial drying of the incoming wet sludge, part of the discharge from the combustor can be utilized to raise the temperature of the combustion supporting ambient air, and a residual portion of the air supply can be utilized to drop the temperature in a final step to a level that will not be destructive of a bag house where the fine particulate matter is extracted while the vapor is returned to the ambient air and is mixed with a supply of air that has been raised in temperature to an oxidizing level for discharge to the ambient atmosphere with the emission from the bag house.

The system also contemplates, as an important object, the combustion of the sludge using technique with specific improvements to obtain greater efficiency in using the prepared sludge material as its own fuel, thereby effecting disposal of sludge by a self preparation technique to support combustion thereof. The term "sludge" is intended to include garbage, waste paper, and material containing an appreciable percentage of burnables.

BRIEF DESCRIPTION OF THE DRAWINGS EMBODIMENT FOR THIS INVENTION

The system of this invention is disclosed in a schematic diagram arranged to provide an operational arrangement of components to make up a waste material system for disposal of a high percentage of burnables in the form of innocent ash.

DETAILED DESCRIPTION OF THE PREFERRED EMBODIMENT

Figure 1:
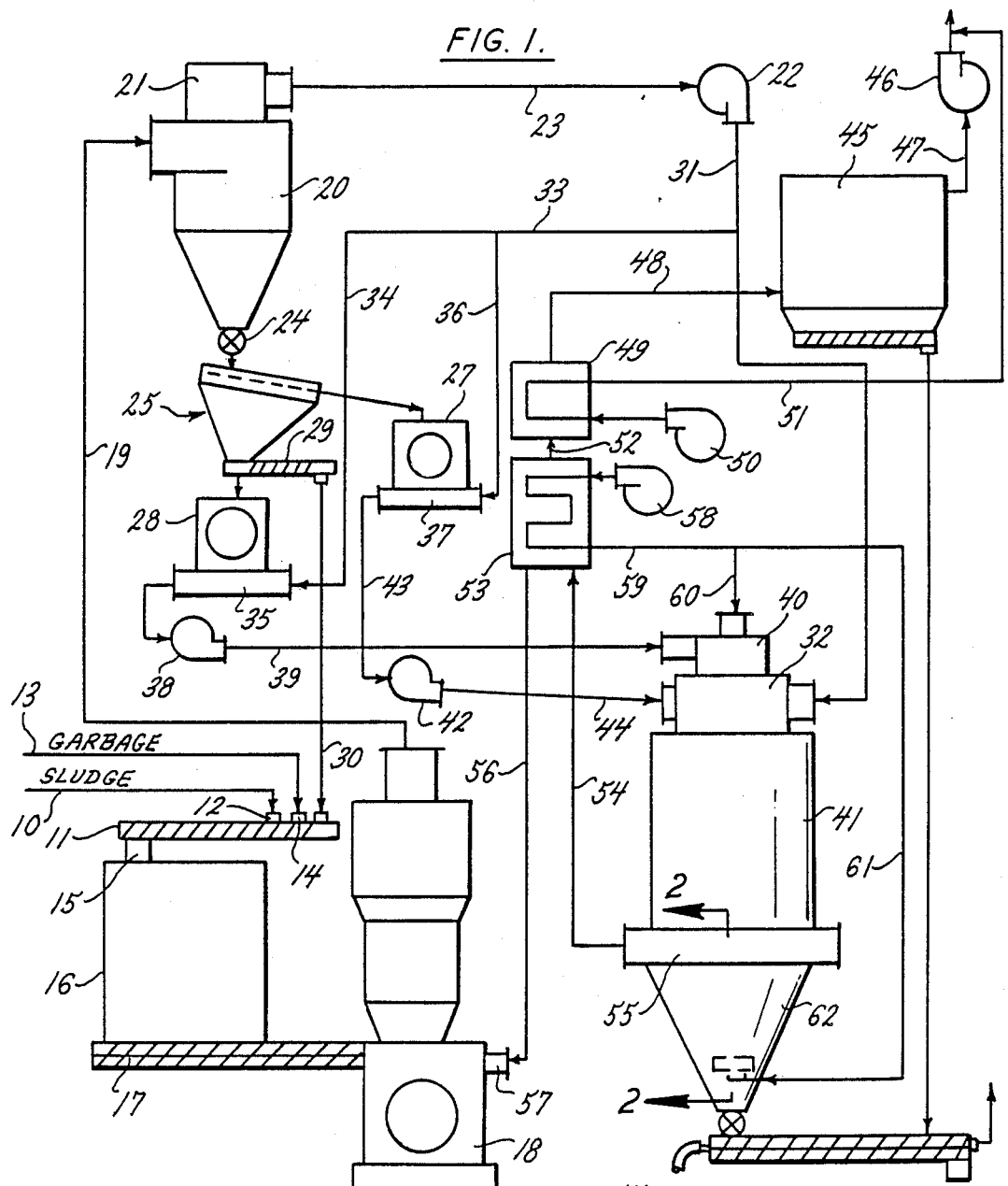
FIG. 1 is a schematic diagram which illustrates the unique system.

In the schematic view of the accompanied drawing there is disclosed a system organization in which a supply of raw sludge, that may have a moisture content as high as 80% moisture and 20% solids, is fed by conduit 10 into a suitable screw conveyor 11 at the inlet 12 thereof. There is an additional supply of garbage brought in by conduit 13 to an inlet 14 in the screw conveyor 11 where the two incoming materials are intermixed to form a composite sludge having a lower total moisture content. The outlet 15 from the screw conveyor 11 delivers the sludge and garbage mixture into a holding bin 16, and the bottom of the bin 16 is equipped with a suitable screw conveyor 17 which delivers the material collected in bin 16 into an impact grinding mill 18. The processing of the composite material in the impact mill 18 proceeds in a known manner to result in the reduced sludge and garbage being air or gas conveyed through a conduit 19 into a cyclone separator 20. The top 21 of the cyclone collects the gas from the cyclone separator 20 and directs it by conduit 23 to the inlet side of a primary fan 22.

It is intended that the operation of the primary fan 22 will move the ground composite material through conduit 19 from the impact grinding mill 18 and cause it to be separated from the transport air and gas medium in the cyclone separator 20 so that the air and gas medium is fed into the primary fan 22 through the conduit 23. The more or less solid residue in the cyclone separator 20 is passed through a rotary control gate 24 for deposit onto a vibratory screen device 25 where paper and oversized and fluffy materials are separated and go to a grinding mill 27 for further reduction while the small, hard, and fine particles pass through the screen and are collected and directed into a mill 28 for sizing as a suitable fuel. Part of the material that passes through the screen is collected in the screen body 25 is conveyed by a screw device 29 to a conduit 30 for return to the main feed screw 11 to condition the incoming materials for moisture reduction.

The air or gas escaping from the cyclone top 21 by operation of the primary fan 22 passes into a conduit system 31 connected into the combustion device 32. Branch conduit 33 has one outlet 34 connected to the outlet 35 of mill 28, and a second branch 36 connected to the outlet 37 for mill 27. The first branch system has a fan 38 to convey the output of mill 28 by conduit 39 to the burner head 40 for the furnace 41. The second branch has a fan 42 which moves the output of mill 27 through conduits 43 and 44 into the combustion device 32 for the furnace 41.

Up to this stage in the system the composition of sludge, garbage and returned particles from the mills 27 and 28 are moved by fans 38 and 42 into the burner 40 and combustion head 32 of the furnace 41. The mixing of the materials by the feed screw 11 brings the high moisture content of the sludge down to a managable level.

The combustor 41 and the items of equipment associated therewith make up a second or material disposal system for effectively reducing, in a somewhat final manner, all of the sludge mixture as ash. The second system includes a bag house 45 and a an exhaust fan 46 at the outlet stack 47. The bag house 45 is connected up to conduit 48 leading from a heat exchanger device 49. The exchanger 49 is provided with an ambient air moving fan 50 which picks up heat which is conducted by conduit 51 to the stack fan outlet to sanitized the exhaust gas. Heat exchanger 49 is connected by a conduit 52 to the outlet from a second heat exchanger 53. The heat exchanger 53 is connected to a conduit 54 leading from the combustor 41 at its hot gas collector 55 (See FIG. 2) junction where a portion of the heated gas can flow into a branch conduit 56 which leads back into an inlet connection 57 at the impact mill 18. The exit conduit 54 of the combustor 41 supplies hot gases and particulates into the heat exchanger 53 where it is applied for the purpose of raising the temperature of a supply of ambient air admitted at inlet fan 58 that can be useful in two ways. One way is to connect the outlet 59 from the exchanger 53 to a conduit 60 to direct air into the burner 40. The air supply allows for excess air to be by-passed by a conduit 61 to the bottom end portion 62 of the combustor 41 where it can bubble up through the ash.

The combustor 41 is a fire brick lined structure which is capable of using the gases and air, and the fuel admitted to the burner device 32 to support combustion and develop at least a temperature of the order of 1650° F. All the gases that have contacted the composite material travelling through the combustor 41 are exposed to the 1650° F. temperature for at least two seconds, thereby sanitizing them prior to exhaust to ambient air. As pointed out above, the burner 32 is supplied with fine particulate matter through conduit 39 from the fan 38, and through conduit 44 from fan 42 so that such material acts as the fuel to support combustion. Also there may be some very fine particulate material drawn through the primary fan 22 and that is transmitted to the burner 32 through the conduit 31, as previously pointed out. Such fine particulate matter also acts as a fuel to support combustion. The incineration of the composite material produces ash that is high in carbon, and at the high temperature of that incineration it becomes activated. Thus there are several ways of moving the composite material from the impact mill 18 from the second and third mills into the combustor 41 by way of conduits 39 and 44, and the other is by conduit 31.

The operation of the combustor 41 involves the provision in the bottom portion 62 of one or more bubbling beds 63 which are formed an extension of conduit 61 with one or more upwardly directed outlets 64 to deliver the excess heated fresh air supplied through conduit 55 into and beneath a cover 65. The cover 65 is directed with its closed side upwardly so that the ash in a combustion state in the combustor 41 and bottom cone 62 cannot fall into the outlets 64 and thereby plug one or more of the outlets. On the other hand, the air can make the necessary reverse flow movement and escape from under the cover 65 and move upwardly thorugh the body of burning material or ash which is moved down from the upper portion of the furnace 41, thereby providing bubbling beds at 63.

Figure 2:
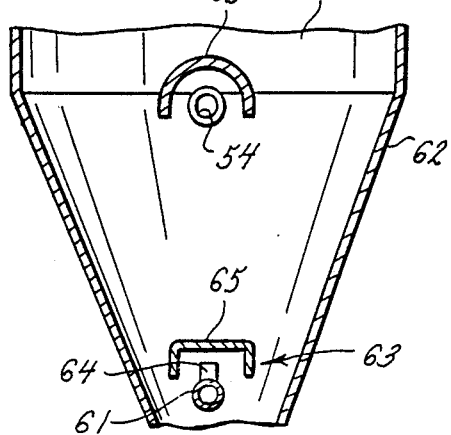
FIG. 2 is a sectional detail taken at line 2—2 in FIG. 1.

It can be seen in the FIGS. 1 and 2 schematic views that the combustor 41 is provided with a transverse windbox device 55 which is a pipe member that is open at the bottom and is positioned to conduct a portion of the air exhausted by fan 46 to move the products of combustion out of the combustor 41 and into the outlet conduit 54 previously identified. A portion of the material in the device 55 that has been cooled by the excess air supplied by conduit 61 in the portion 62 of the combustor 41 can be directed through conduit 54 to exchanger 53 and then by conduit 56 to the inlet 57 at the mill 18, while another portion may be drawn through the conduit 52 by operation of the discharge blower or fan 46. The division of the material passing out through conduit 54 and into conduits 52 and 56 can be proportioned in relation to the speed of the blower or fan 46.

The portion of the hot gases passing the outlet 55 from the combustor 41 through conduit 54 to the heat exchanger 53, may have a temperature at the outlet conduit 52 that is too high and therefore destructive of the bag elements in the bag house 45. In order to control the outlet temperature of the gas going to the bag house 45 there is provided the heat exchanger 49 that will admit ambient air at fan 50 so that the temperature of the hot gas flow in conduit 48 can be brought down to a range of the order of 350° F. The ambient air is raised in temperature so it has a temperature of the order of 900° F. which is sufficient to sanitize the exhaust gases at the stack 47.

It should now be apparent from the foregoing description of the schematic disclosure of a presently preferred embodiment of apparatus that the composite material delivered at the screw conveyor 11 is initially prepared for its self destruction through the combined operation of the impact grinder mill 18 where hot gases at approximately 1200° F. enter at the inlet 57 to partially dry the composite material while it is simultaneously being grounded to reduce it to a suitable fuel size. The output from the mill 18 is processed in a cyclone device 20 where the semi dried material is discharged through a rotary valve 24 so that some of the material can be recycled back by screw conveyor 29 and conduit 30 to the mixing screw conveyor 11 so as to effectively establish a drying condition of the composite material in the bin 16 with a moisture level of approximately 50% water.

A preferred embodiment of the present invention has been described in connection with the drawing views so as to illustrate a possible organization of equipment to practice a method for disposing by incineration of waste material containing sludge and garbage of various kinds which when combined results in a composite waste material. That composite waste material can be disposed of by performing multiple steps in its handling wherein the composite material is first subjected to a grinding step for thorough intermixing of the sludge that may contain a high percentage of moisture and garbage that can contain very little moisture. After grinding the composite waste material, it is processed in a cyclone where the gases that are used to transport the ground matter can be separated while the solids are subjected to classification by the use of a vibratory screen where the paper, fluffy waste, and similar materials can be separated from the smaller and harder particulate components. The separated components are subjected to individual impact grinding steps prior to being recombined in the combustor where incineration takes place. The gases separated in the cyclone separator are reapplied to the grinding steps for moving such material into the incinerating combustor, and any excess gases are delivered to the incinerator, along with ambient air for establishing sufficient oxygen to support combustion in the furnace at a temperature that will sanitize and destroy odors during the incineration of the waste material.

The incineration step produces a hot gas outlet supply for the purpose of supplying a portion of that outlet gas to the initial grinding of the sludge and garbage so as to promote substantial drying. Another portion of the hot gas outlet from the incineration step is applied in a heat transfer manner to preheat the incoming ambient air, which preheating drops the residual temperature of the hot gas to a level that will be acceptable in a bag collector where any residual fines can be captured while the gas is evacuated to the outside. The ash that is produced in the incineration step is discharged after it has passed through a bubbling bed where a portion of the preheated ambient air is supplied as the bubbling media for securing a final incineration of the waste material.

What is claimed is:

1. In a system for disposing by incineration of composite waste material containing sludge and garbage, the system comprising the steps of:
   (a) processing the composite waste material in multiple steps of reduction which includes a first step wherein all of the composite waste material is processed and thereafter the composite waste material is separated into different classes of fuel material for individual reduction in second and third steps, to form the composite waste into a fuel suitable for incineration;
   (b) carrying on incineration of the processed fuel to produce hot gases in the presence of preheated ambient air; and
   (c) moving hot gases from the incineration of the processed fuel for drying and transporting the processed composite waste material in the first step and is withdrawn following the first step of reduction and is returned upon the completion of the second and third steps of reduction for transporting the different classes of reduced material into the incineration of the processed fuel, for introduction into the processing of the composite waste material for drying and transporting such processed composite waste material through the multiple steps of reduction, for heating ambient air supplied to the incineration of the processed fuel, and for heat exchange between ambient air and hot gases to drop the hot gas temperature prior to release to ambient atmosphere.

2. In a system for disposing by incineration of composite waste material containing sludge and garbage, the system comprising the steps of:
   (a) admitting composite waste material to an initial reduction step;
   (b) processing the reduced composite waste material to a classification step in which oversized material is separated out from undersized material;
   (c) separately reducing the oversized and undersized material to form a primary fuel source;
   (d) utilizing hot gas to transport the initially reduced composite waste material to the classification step and then withdrawing the hot gas for subsequent use to transport the primary fuel;
   (e) delivering the primary fuel for disposal in an incineration step to convert it to sanitized ash;
   (f) supplying preheated ambient air into the incineration step to supply oxygen;
   (g) withdrawing hot gases from the incineration step for use as the source of the hot gas for transporting and drying the initially reduced composite waste material followed by transporting the primary fuel, and for preheating the ambient air prior to its delivery to the incineration step;
   (h) directing hot gas withdrawal from the incineration step for passage into a first heat exchange relationship with ambient air for effecting the preheating of the ambient air and for thereafter passage to a second heat exchange relationship with a further supply of ambient air for further reducing the temperature of the hot gas;
   (i) filtering the reduced temperature gas to relieve it of fine ash residual carried over from the incineration step prior to release of such reduced temperature gas to ambient atmosphere;
   (j) redirecting the further supply of ambient air into the gas for further sanitizing said gas after filtering; and thereafter
   (k) releasing the residual sanitized hot gas to the ambient atmosphere following the extraction of residual ash carried over from the incineration step.

* * * * *